Oct. 11, 1960        F. SCHÄFER        2,956,191

COMMUTATOR ARRANGEMENT

Filed Nov. 19, 1958

INVENTOR
Fridolin Schäfer by:
Michael S. Striker
Attorney

United States Patent Office 2,956,191
Patented Oct. 11, 1960

2,956,191

COMMUTATOR ARRANGEMENT

Fridolin Schafer, Stuttgart, Germany, assignor to Robert Bosch, G.m.b.H., Stuttgart, Germany Filed Nov. 19, 1958, Ser. No. 775,017

Claims priority, application Germany Nov. 28, 1957

7 Claims. (Cl. 310—235)

The present invention relates to commutators.

More particularly, the present invention relates to commutators which are especially suitable for use in generators and starting motors of automobiles.

In commutators of this type the inner surface of the commutator is tubular so as to receive the shaft of the generator or motor, and the present invention relates particularly to the structure which forms the inner tubular part of the commutator which receives the shaft of the motor or generator.

One of the objects of the present invention is to provide a commutator with an inner tubular structure which is inexpensive and which guarantees a reliable connection between the inner part of the commutator with the plastic material of the sleeve of the commutator.

Another object of the present invention is to provide a commutator with an inner tubular structure which will reliably provide spaces for the material of the plastic sleeve of the commutator irrespective of the diameter of the inner tubular part of the commutator.

With the above objects in view the present invention includes in a commutator an elongated sleeve having inner and outer portions. A plurality of commutator segments are embedded in the outer portion of this sleeve and a wire coil is embedded in the inner portion of the sleeve and forms an inner tubular surface of the commutator. In accordance with the present invention each of the convolutions of this wire coil has a pair of opposed side surfaces respectively directed toward the neighboring convolutions and at only one of these side surfaces of each convolution a plurality of projections are fixed to each convolution and project therefrom toward the next convolution so as to maintain the convolutions spaced from each other to guarantee that the material of the sleeve can be located between the convolutions.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
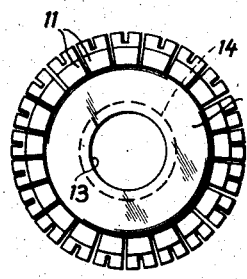
Fig. 1 is an end view of a commutator according to the present invention.
Figure 2:
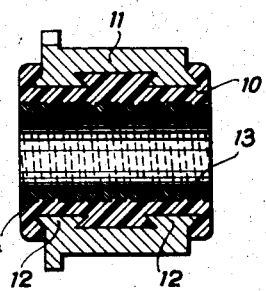
Fig. 2 is an axial sectional view of a commutator according to the present invention.

Referring now to Figs. 1 and 2, the commutator illustrated therein includes an elongated sleeve 10 made of an electrically non-conductive plastic material formed in a suitable mold under pressure. The commutator segments 11 are carried by the mold during the formation of the sleeve 10 so that the commutator segments 11 become embedded in the outer portion of the sleeve 10 as shown in Fig. 2. The commutator segments 11 have feet 12 of dovetail cross section so that the material of the sleeve 10 flows during manufacture of the sleeve 10 around the feet 12 and when the material of the sleeve 10 hardens the segments 11 will be reliably anchored to the sleeve 10.

The commutator includes an inner tubular surface 13 for receiving the shaft of the motor or generator, and this inner tubular surface 13 is formed in part by a wire coil 14 which is coiled from a steel wire 15. The wire 15 is of a special construction according to the present invention which will guarantee that the adjoining convolutions of the coil will engage each other only at spaced localized areas and will otherwise be spaced from each other when the wire 15 is wound into a coil. By maintaining the space between the convolutions of the coil the material of the sleeve 10 can press into the space between the convolutions of the coil in order to provide a reliable connection of the coil 14 to the sleeve 10, this coil 14 being embedded in the inner portion of the sleeve 10. The coil 14 is also supported in the mold in a known way during the manufacture of the sleeve 10, so that the material of the sleeve 10 before it hardens can flow into the space between the convolutions of the coil 14 to provide a reliable embedding and connection of the coil 14 with the sleeve 10.

Figure 3:
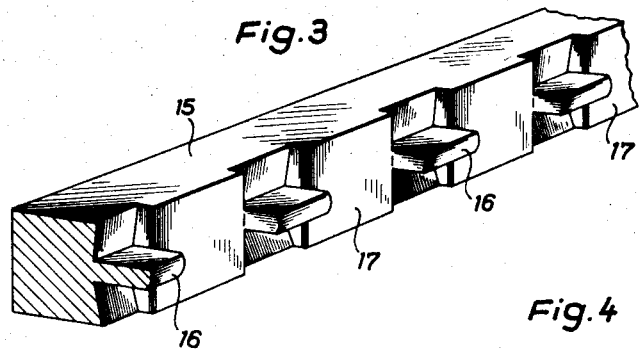
Fig. 3 is a fragmentary perspective view of one embodiment of a wire used in the commutator of the invention.

In order to clearly illustrate the structure of the wire 15 of the invention, a section of the wire 15 is shown on an enlarged scale in Fig. 3. The wire 15 is of a square cross section and each of the sides of the wire 15 has a width of 2 mm. At only one of its side surfaces the wire 15 is provided with a plurality of projections 16 which are uniformly spaced from each other along this one side surface of the wire 15, the distance between each pair of successive projections 16 being approximately 5 mm. As may be seen from Fig. 3 the projections 16 extend only from the side surface 17 of the wire 15. Unillustrated punches of a stamping press form the projections 16 from the material of the wire 15. Each of the projections 16 has a thickness of approximately 0.5 mm. and a length of 2 mm. measured longitudinally of the wire. It will be noted from Fig. 3 that the projections 16 are all located at the same elevation between the top and bottom faces of the wire 15, as viewed in Fig. 3, substantially mid-way between these faces. Each of the projections 16 extends outwardly beyond the side surface 17 by a distance of approximately 0.8 mm.

Thus, when the wire 15 is wound so as to form a coil each of the convolutions of the coil will have a pair of opposed side surfaces respectively directed toward the neighboring convolutions of the coil, and only one of the side surfaces of each convolution will have the projections 16 which will project beyond the side surface 17 of each convolution by a distance of approximately 0.8 mm. in the direction of the axis of the coil. In this way it is impossible for the convolutions of the coil to engage each other except for the engagement between the projections 16 with the next convolution, and because the projections 16 are spaced from each other there is maintained between the convolutions a space into which the material of the sleeve 10 can flow so as to provide a reliable bond between the wire coil and the material of the sleeve in which the coil is embedded.

The stiffness or rigidity of the wire coil can be increased by soldering the convolutions thereof to each other. Thus, the projections 16 of each convolution can be soldered to the next convolution. This soldering can be carried out in a very simple manner if the wire as shown in Fig. 3 is provided with a coating of copper in a galvanic bath. The wire which has been coated in this way can then be wound into a coil and can be placed in an oven in an inert gas atmosphere at a temperature which is higher than the melting point of copper. In this way the copper coating flows and becomes fused at the places where the projections 16 engage the next convolution, and then the coil is removed from the oven so that the copper hardens to provide a good soldered connection between the convolutions of the coil.

Figure 4:
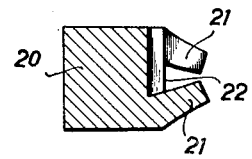
Fig. 4 is a transverse sectional view of another embodiment of a wire according to the present invention, the section of Fig. 4 being taken along line IV—IV of Fig. 5 in the direction of the arrows.
Figure 5:
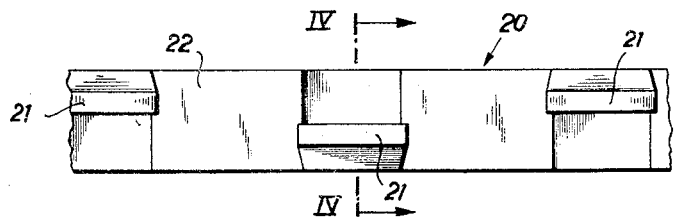
Fig. 5 is a side fragmentary view of another embodiment of a wire of the present invention.

Instead of the construction shown in Fig. 3, a wire as illustrated in Figs. 4 and 5 may be used to form the coil 14 of the commutator of the invention. The wire 20 of Fig. 5 is also of a square cross section. This wire is provided along one of its side surfaces 22 with projections 21 which are sheared from the material of the wire 20, and it will be noted from Figs. 4 and 5 that the projections 21 are offset from the axis of the wire. The projections 21 are formed by unillustrated shearing punches which cut into the material of the wire 20 at a depth of approximately 0.3 mm. so as to curve outwardly from the material of the wire the projections 21 illustrated in Figs. 4 and 5. Referring to Fig. 4, the shearing punch will move downwardly only part of the way through the wire to form the lower projection 21 illustrated in Fig. 4 and upwardly only through part of the wire to form the upper projection 21 shown therein. It will be noted from Figs. 4 and 5 that the shearing takes place alternately from opposite side surfaces of the wire so that the successive projections 21 are alternately located next to a pair of opposed side surfaces of the wire which will respectively form the inner and outer surfaces of the coil. The projections 21 are of such a size that they project outwardly beyond the side surface 22 of the wire 20 by a distance of approximately 0.9 mm. so that when the wire 20 is wound into a coil the projections 21 will guarantee that the convolutions will be spaced from each other along the axis of the coil by a distance of approximately 0.9 mm.

A particular advantage of the structure of the invention resides in the arrangement of the projections at only one of the side surfaces of each of the convolutions of the coil. In this way the spacing between the convolutions of the coil will be guaranteed irrespective of the diameter of the coil. If the projections were located at both sides of each convolution then at certain coil diameters the projections of one convolution could be located between the projections of the next convolution and would close the space between the convolutions. However, by locating the projections at only one side of each convolution such a location of projections of one convolution between projections of the next convolution are reliably avoided and the spacing between the convolutions is guaranteed irrespective of the particular diameter of each convolution.

It will be understood that each of the elements described above, or two or more together, may also find a useful application in other types of commutators differing from the types described above.

While the invention has been illustrated and described as embodied in wire coils for commutators, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a commutator, in combination, an elongated sleeve having inner and outer portions; a plurality of commutator segments embedded in said outer portion of said sleeve; and a wire coil embedded in said inner portion of said sleeve, said coil forming an inner tubular surface of the commutator and including a plurality of convolutions each of which has a pair of opposed side surfaces respectively directed toward the neighboring convolutions and each convolution having at only one of its side surfaces a plurality of projections spaced along each convolution and projecting therefrom in the axial direction of the commutator toward and into engagement with the neighboring convolution to maintain the convolutions of the wire spaced from each other so that the material of the sleeve can be located between the spaced convolutions.

2. In a commutator, in combination, an elongated sleeve having inner and outer portions; a plurality of commutator segments embedded in said outer portion of said sleeve; and a wire coil embedded in said inner portion of said sleeve and forming an inner tubular surface of the commutator, said wire coil having a plurality of convolutions each of which has opposed side surfaces respectively directed toward the neighboring convolutions and each convolution having at only one of said side surfaces thereof a plurality of integral projections spaced along said side surface and projecting therefrom toward the next convolution so that said projections maintain the convolutions of the wire coil spaced from each other whereby the material of the sleeve can be located between the convolutions.

3. In a commutator, in combination, an elongated sleeve having inner and outer portions; a plurality of segments embedded in said outer portion of said sleeve; and a wire coil embedded in said inner portion of said sleeve and forming an inner tubular surface of the commutator, said coil having a plurality of convolutions each of which has a pair of opposed side surfaces respectively directed toward the neighboring convolutions and an inner surface directed toward the axis of the commutator and an outer surface directed away from the axis of the commutator, and each convolution having at only one of said side surfaces thereof a plurality of projections spaced along said one side surface substantially mid-way between the inner and outer surfaces of said convolution and projecting from said one side surface toward the next convolution for maintaining the convolutions spaced from each other to enable the material of the sleeve to be located between the convolutions.

4. In a commutator, in combination, an elongated sleeve having inner and outer portions; a plurality of segments embedded in said outer portion of said sleeve; and a wire coil embedded in said inner portion of said sleeve and forming an inner tubular surface of the commutator, said wire coil including a plurality of convolutions each of which has a pair of opposed side surfaces directed toward the neighboring convolutions, respectively, an inner surface directed towards the axis of the commutator, and an outer surface directed away from the axis of the commutator, and each convolution having a plurality of projections spaced from each other along only one of said side surfaces and projecting toward the next convolution to maintain the convolutions spaced from each other so that the material of the sleeve can be located between the convolutions, said projections being alternately located adjacent to the inner and outer surfaces of each convolution.

5. In a commutator, in combination, an elongated sleeve having inner and outer portions; a plurality of segments embedded in said outer portion of said sleeve; and a wire coil embedded in said inner portion of said sleeve and forming an inner tubular surface of the commutator, said coil having a plurality of convolutions each of which has a pair of opposed side surfaces respectively directed toward the neighboring convolutions and each convolution being formed in only one of said side surfaces with a plurality of recesses spaced along one said side surface and each convolution having a plurality of integral projections respectively projecting from said recesses beyond said one side surface of each convolution toward the next convolution so that said projections maintain said convolutions spaced from each other to enable the material of the sleeve to be located between the convolutions.

6. In a commutator, in combination, an elongated sleeve having inner and outer portions; a plurality of segments embedded in said outer portion of said sleeve; and a wire coil embedded in said inner portion of said sleeve and forming an inner tubular surface of the commutator, said coil being of rectangular cross section and having a plurality of convolutions each of which has a pair of opposed side surfaces respectively directed toward the neighboring convolutions and each convolution having along only one of said side surfaces a plurality of projections projecting beyond said one side surface toward the next convolution so that said projections maintain the convolutions spaced from each other to enable the material of the sleeve to be located between the convolutions.

7. In a commutator, in combination, an elongated sleeve having inner and outer portions; a plurality of segments embedded in said outer portion; and a wire coil embedded in said inner portion and forming an inner tubular surface of the sleeve, said coil having a plurality of convolutions each of which has a pair of opposed side surfaces respectively directed toward the neighboring convolutions and each convolution having along only one of said side surfaces thereof a plurality of projections spaced along said one side surface and projecting therefrom toward the next convolution in the direction of the axis of the commutator and the projections of each convolution being soldered to the next convolution.

References Cited in the file of this patent

UNITED STATES PATENTS

| | | |
|---|---|---|
| 2,654,124 | Layte | Oct. 6, 1953 |
| 2,773,209 | Kirkwood | Dec. 4, 1956 |

FOREIGN PATENTS

| | | |
|---|---|---|
| 107,637 | Sweden | June 15, 1943 |
| 906,853 | France | May 22, 1945 |